US012724376B2

(12) United States Patent
Adachi

(10) Patent No.: US 12,724,376 B2
(45) Date of Patent: Sep. 1, 2026

(54) CLEANING DEVICE AND IMAGE FORMING DEVICE INCLUDING THE SAME

(71) Applicant: SHARP KABUSHIKI KAISHA, Sakai City (JP)

(72) Inventor: Katsumi Adachi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/014,547

(22) Filed: Jan. 9, 2025

(65) Prior Publication Data

US 2025/0237993 A1 Jul. 24, 2025

(30) Foreign Application Priority Data

Jan. 23, 2024 (JP) ................................ 2024-007741

(51) Int. Cl.
*G03G 21/00* (2006.01)
*G03G 15/00* (2006.01)
*G03G 15/02* (2006.01)

(52) U.S. Cl.
CPC ..... *G03G 21/0011* (2013.01); *G03G 15/0216* (2013.01); *G03G 21/0005* (2013.01); *G03G 21/007* (2013.01)

(58) Field of Classification Search
CPC ........... G03G 15/0216; G03G 21/0005; G03G 21/0011; G03G 21/007
See application file for complete search history.

(56) References Cited

U.S. PATENT DOCUMENTS

| | | | | |
|---|---|---|---|---|
| 9,110,431 B2 * | 8/2015 | Fukuda | G03G 21/0011 | |
| 9,146,526 B2 * | 9/2015 | Yamaguchi | G03G 21/0011 | |
| 2015/0220020 A1 * | 8/2015 | Hayashi | G03G 15/0898 | 399/102 |
| 2016/0109830 A1 * | 4/2016 | Mizukoshi | G03G 15/0813 | 399/103 |
| 2016/0170370 A1 * | 6/2016 | Shimizu | G03G 15/0817 | 399/102 |

FOREIGN PATENT DOCUMENTS

JP 2005-234164 A 9/2005

* cited by examiner

*Primary Examiner* — Sophia S Chen
(74) *Attorney, Agent, or Firm* — ScienBiziP, P.C.

(57) ABSTRACT

A cleaning device that includes a cleaning blade for scraping away toner remaining on a surface of an image carrier is provided. The cleaning blade also scrapes away toner that remains on a respective seal member that is in contact with the surface of the image carrier at side end portions of the cleaning blade. The seal member includes a first sealant extending along a side end surface of the cleaning blade, and a second sealant extending from one end portion of the first sealant and extending along a tip surface of the cleaning blade. The second sealant extends to a position including a first region within a charging region and outside of a development region. An end portion on the cleaning blade side of the second sealant in the first region is angled away from the surface of the image carrier.

9 Claims, 9 Drawing Sheets

CLEANING DEVICE AND IMAGE FORMING DEVICE INCLUDING THE SAME

CROSS-REFERENCE TO RELATED APPLICATION

The present application claims priority from Japanese Application JP 2024-007741, the content of which is hereby incorporated by reference into this application.

BACKGROUND

1. Field

The disclosure relates to a cleaning device and an image forming device including the cleaning device, and more particularly, for example, to a cleaning device that removes toner remaining on a surface of an image carrier and an image forming device including the cleaning device.

BACKGROUND ART

An example of a known cleaning device includes a housing having a cleaning blade disposed parallel to a photoreceptor drum (image carrier) such that a tip edge portion (edge portion) of the cleaning blade faces a circumferential surface of the photoreceptor drum. The housing is provided with seal members that are in surface contact with the circumferential surface at both side portions of the photoreceptor drum at outer-side positions of both side end portions of the cleaning blade. The seal members prevent the leakage of toner from the both side end portions of the cleaning blade.

SUMMARY

The toner remaining on the surface of the image carrier after image formation is removed and collected by the cleaning blade, and part of the collected toner (waste toner) plays a role as a lubricant for the edge portion of the cleaning blade. That is, the presence of the waste toner at a contact portion between the cleaning blade and the image carrier reduces frictional resistance between the cleaning blade and the image carrier, thereby preventing the cleaning blade from being reversed.

However, the supply of toner is small in quantity at the both side end portions (both end portions in the longitudinal direction) of the cleaning blade, particularly at a portion within a charging region and outside of a development region. Because of this, an increase in frictional force tends to locally occur at this portion, and the contact posture of the cleaning blade with respect to the image carrier becomes unstable, whereby excessive deformation (entanglement) of the edge portion occurs, and consequently the cleaning blade is curled or reversed.

Accordingly, a primary object of the disclosure is to provide a novel cleaning device and an image forming device including the cleaning device.

Another object of the disclosure is to provide a cleaning device capable of preventing a cleaning blade from being curled and reversed with a simple configuration, and an image forming device including the cleaning device.

A first disclosure is a cleaning device that removes toner remaining on a surface of an image carrier, the cleaning device including: a cleaning blade that causes an edge portion at a tip side of the cleaning blade to be in contact with an image carrier to scrape away toner remaining on a surface of the image carrier; and a seal member provided to be in contact with the surface of the image carrier at each of positions corresponding to both side end portions of the cleaning blade, wherein the seal member includes a first sealant extending along a side end surface of the cleaning blade, and a second sealant extended from one end portion of the first sealant and extending along a tip surface of the cleaning blade; the second sealant is extended to a position including a first region within a charging region and outside of a development region; and an end portion on the cleaning blade side of the second sealant in the first region is disposed at a position away from the surface of the image carrier (i.e., the edge portion of the cleaning blade).

According to the first disclosure, it is possible to appropriately prevent the cleaning blade from being curled and reversed with a simple configuration in which the second sealant of the seal member is extended and the end portion on the cleaning blade side of the second sealant is disposed at a position away from the surface of the image carrier. Further, since the interference of the second sealant with the edge portion of the cleaning blade can be prevented, it is possible to appropriately prevent failures such as a cleaning failure caused by the interference.

A second disclosure according to the first disclosure is such that a separation distance between the end portion on the cleaning blade side of the second sealant in the first region and the surface of the image carrier gradually increases toward the cleaning blade side.

A third disclosure according to the second disclosure is such that an attachment surface to which the end portion on the cleaning blade side of the second sealant in the first region is attached is an inclined surface that is separated from the surface of the image carrier toward the cleaning blade side.

A fourth disclosure according to the first or second disclosure is such that an end surface on the cleaning blade side of the second sealant in the first region is in contact with the tip surface of the cleaning blade.

A fifth disclosure according to the first or second disclosure is such that a separation distance between an edge on the cleaning blade side of the second sealant in the first region and also on the image carrier side and the surface of the image carrier is in a range from 0.2 mm to a value that is 0.2 mm smaller than a thickness of the cleaning blade.

A sixth disclosure according to the first or second disclosure is such that the second sealant includes a slit extending from an end surface on the cleaning blade side of the second sealant in a direction orthogonal to the end surface.

A seventh disclosure according to the sixth disclosure is such that the slit is formed at a position in a second region between a side end of the cleaning blade and a side end of the charging region.

An eighth disclosure is an image forming device including: an image carrier; a charging device that charges a surface of the image carrier; and the cleaning device according to the first disclosure that removes toner remaining on the surface of the image carrier.

A ninth disclosure according to the eighth disclosure is such that a scheme of charging the image carrier by the charging device is a contact charging scheme.

The disclosure makes it possible to appropriately prevent the cleaning blade from being curled and reversed with a simple configuration.

The above-mentioned object, other objects, features, and advantages of the disclosure will be further clarified from the detailed description of examples given below with reference to the drawings.

DESCRIPTION OF EMBODIMENTS

First Example

Figure 1:
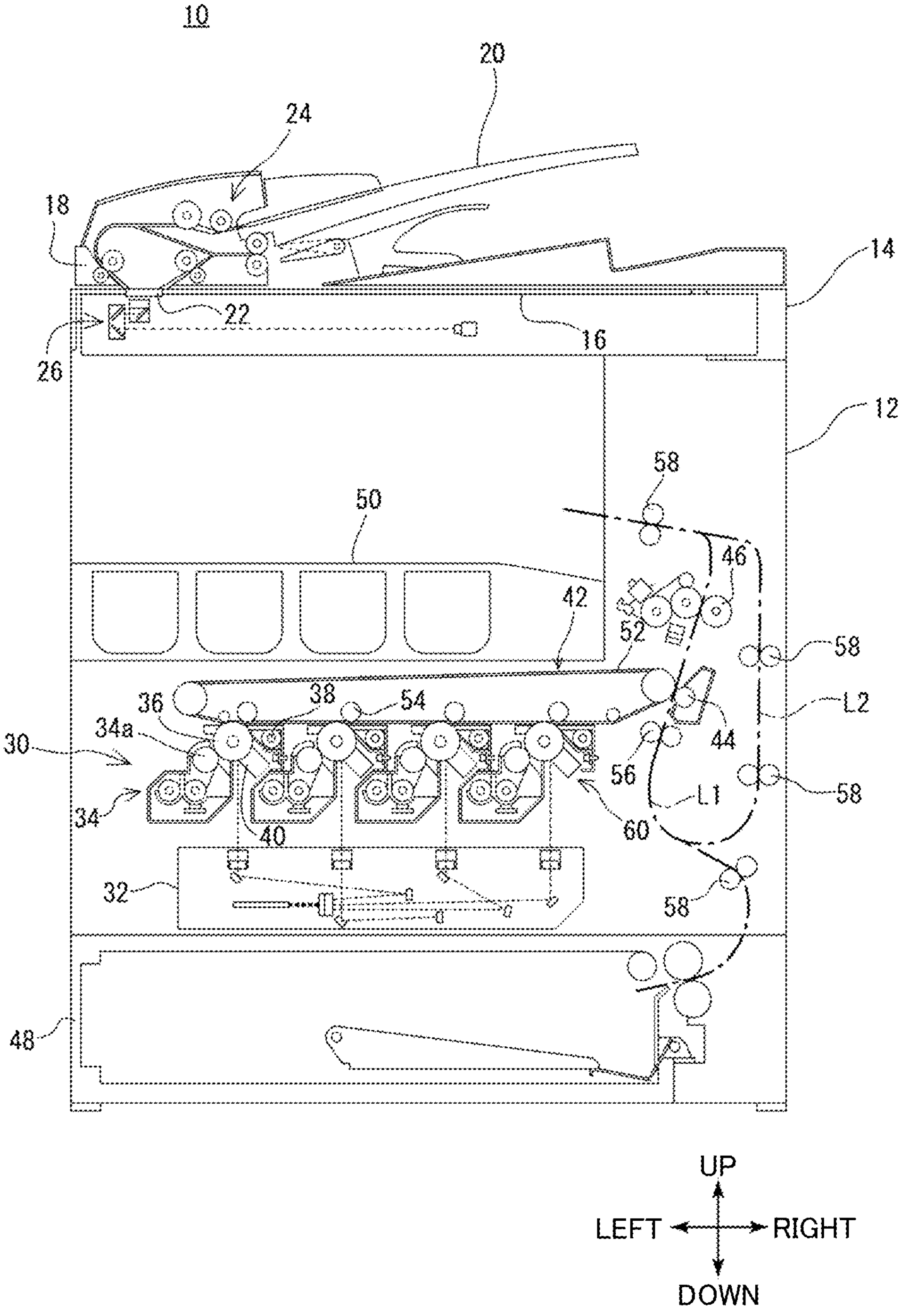
FIG. 1 is a schematic cross-sectional view illustrating an internal structure of an image forming device including a cleaning device according to a first example of the disclosure.

Referring to FIG. 1, a cleaning device 38 as a first example of the disclosure is used in an image forming device 10 to remove toner remaining on a surface of a photoreceptor drum 36 as an example of an image carrier after image formation (after transfer). As will be described in detail later, the cleaning device 38 includes a cleaning blade 72 and the like, and is integrated with the photoreceptor drum 36, a charging device 40, and the like to constitute a process unit 60.

First, a basic configuration of the image forming device 10 will be schematically described. In the first example, a surface facing a standing position of a user who operates the image forming device 10, that is, a surface on a side where an operation unit (not illustrated) is provided is defined as a front surface (the front). Based on this, a front-rear direction (depth direction) of the image forming device 10 and constituent members thereof is defined. The operation unit is provided on the front side of the paper surface of FIG. 1. A left-right direction (lateral direction) of the image forming device 10 and its constituent members is defined based on a state in which the image forming device 10 is viewed from the front.

As illustrated in FIG. 1, the image forming device 10 is a multifunction peripheral (MFP) having a copy function, a printer function, a scanner function, a facsimile function, and the like, and forms an image of multicolor or monochrome on a sheet (recording medium) by an electrophotography technique. The image forming device 10 includes a device main body 12 provided with an image former 30 and the like, and an image reader 14 disposed above the device main body 12.

The image reader 14 includes a document table 16 formed of a transparent material. A document pressing cover 18 is mounted in an openable and closable manner on the document table 16 via a hinge or the like. The document pressing cover 18 is provided with an automatic document feeder (ADF) 24 configured to automatically feed documents placed on a document placement tray 20 to an image reading position 22 one by one. Although not illustrated, an operation unit (operation panel) that receives an input operation such as a print command by a user is provided at the front surface side of the document table 16. The operation unit is appropriately provided with a display with a touch panel, operation buttons, and the like.

The image reader 14 includes therein an image scanner 26 provided with a light source, a plurality of mirrors, an imaging lens, a line sensor, and the like. The image scanner 26 exposes a document surface with the light source and guides reflected light reflected from the document surface to the imaging lens by the plurality of mirrors. Then, the reflected light is formed into an image on the light receiving element of the line sensor by the imaging lens. The line sensor detects luminance, chromaticity, and the like of the reflected light forming the image on the light receiving element, and generates image data based on the image on the document surface. As the line sensor, a charge coupled device (CCD), a contact image sensor (CIS), or the like is used.

In the device main body 12, a controller (not illustrated) including a CPU, a memory and the like, the image former 30, and the like are incorporated. The controller transmits a control signal to each site of the image forming device 10 in response to an input operation or the like to the operation unit or the like by a user, and causes the image forming device 10 to execute various operations.

The image former 30 includes an exposure unit 32, a developing unit 34, the photoreceptor drum 36, the cleaning device 38, the charging device 40, an intermediate transfer belt unit 42, a transfer roller 44, a fixing unit 46 and the like, and forms an image on a sheet conveyed from a feed tray 48 or the like and discharges the sheet on which the image is formed to a discharge tray 50. As image data for forming an image on a sheet, image data read by the image scanner 26, image data transmitted from an external computer, or the like is used.

Image data handled in the image forming device 10 corresponds to a color image made of four colors of black (K), cyan (C), magenta (M), and yellow (Y). Therefore, four developing units 34, four photoreceptor drums 36, four cleaning devices 38, and four charging devices 40 are provided to form four kinds of latent images corresponding to the respective colors, whereby four image stations are constituted.

The photoreceptor drum 36 is an image carrier having a photosensitive layer formed on a surface thereof, and is rotatable about an axis by a driver (not illustrated). The charging device 40 includes a charging roller **40*a* (see FIG. 2) and the like, and charges the surface of the photoreceptor drum 36 to a predetermined potential. The exposure unit 32 is configured as a laser scanning unit (LSU) including a laser diode, a polygon mirror, and the like, and forms an electrostatic latent image corresponding to image data on the surface of the photoreceptor drum 36 by exposing the charged surface of the photoreceptor drum 36. The developing unit 34 includes a developing roller 34*a* and the like, supplies toner to the surface of the photoreceptor drum 36, and develops the electrostatic latent image formed on the surface of the photoreceptor drum 36** with the toner (forms a toner image).

Figure 2:
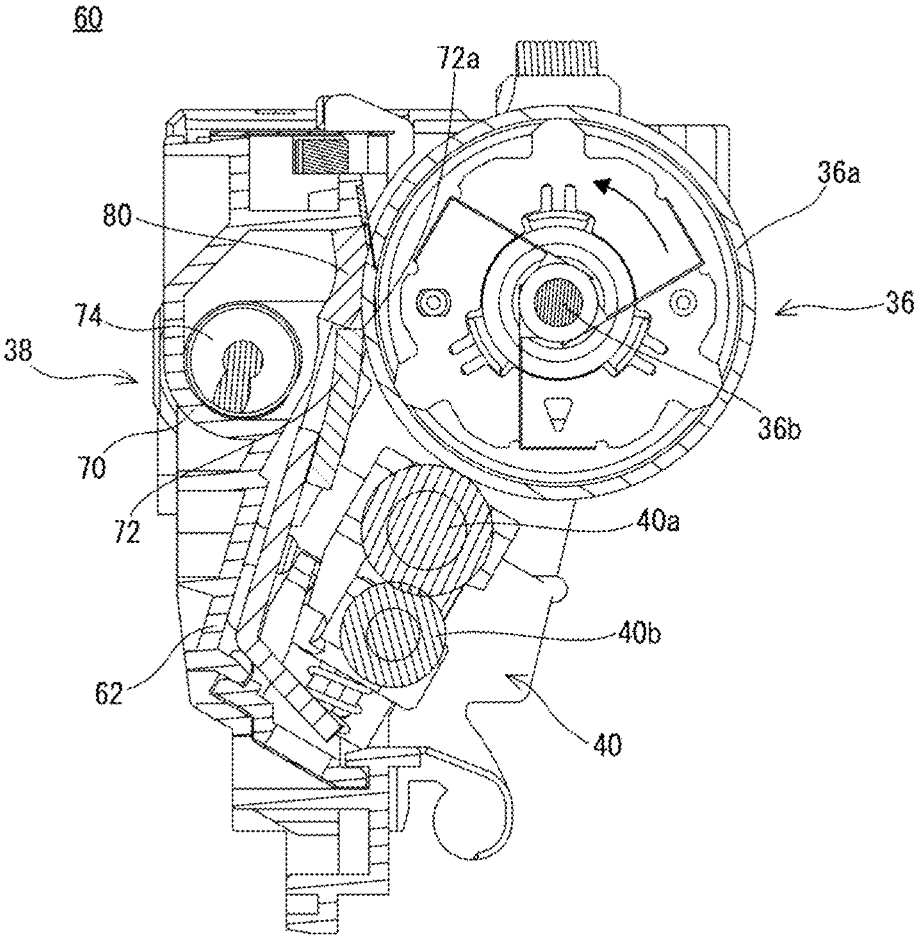
FIG. 2 is a cross-sectional view illustrating an appearance of a process unit included in the image forming device as viewed from a rear side.

The cleaning device 38 removes and collects the toner remaining on the surface of the photoreceptor drum 36 after the toner image is transferred to the intermediate transfer belt 52. The toner (waste toner) collected by the cleaning device 38 is discharged to a waste toner box (not illustrated) provided in a front portion of the device main body 12. As illustrated in FIG. 2, the photoreceptor drum 36, the cleaning device 38, and the charging device 40 are integrated (made to be a cartridge) to constitute the process unit 60. Specific configurations of the process unit 60 and the cleaning device 38 will be described later.

Referring back to FIG. 1, the intermediate transfer belt unit 42 includes an intermediate transfer belt 52, a driving roller, a driven roller, and four intermediate transfer rollers 54. The intermediate transfer belt 52 is provided to be in contact with the photoreceptor drums 36, and the toner images of the respective colors formed on the photoreceptor drums 36 are sequentially superimposed and transferred onto the intermediate transfer belt 52 by using the intermediate transfer rollers 54, thereby forming a toner image of multicolor on the intermediate transfer belt 52. The transfer roller 44 is disposed near the driving roller, and the toner image formed on the intermediate transfer belt 52 is transferred to the sheet when the sheet passes through a nip region between the intermediate transfer belt 52 and the transfer roller 44.

The fixing unit 46 includes a heat roller, a pressure roller, and the like, and is disposed above the transfer roller 44. The heat roller is set to have a predetermined fixing temperature, and when the sheet passes through a nip region between the heat roller and the pressure roller, the toner image having been transferred to the sheet is melted, mixed, and pressed, whereby the toner image is thermally fixed to the sheet.

A first sheet conveying path L1 is formed in the device main body 12 to convey a sheet from the feed tray 48 or the like to the discharge tray 50 via a registration roller 56, the transfer roller 44, and the fixing unit 46. In addition, when duplex printing is performed on a sheet, a second sheet conveying path L2 is formed to return the sheet, which has passed through the fixing unit 46 after single-side printing, to the first sheet conveying path L1 at the upstream side in a sheet transport direction of the transfer roller 44. A plurality of conveying rollers 58 are appropriately provided to give an auxiliary driving force to the sheet in the first sheet conveying path L1 and the second sheet conveying path L2.

Figure 3:
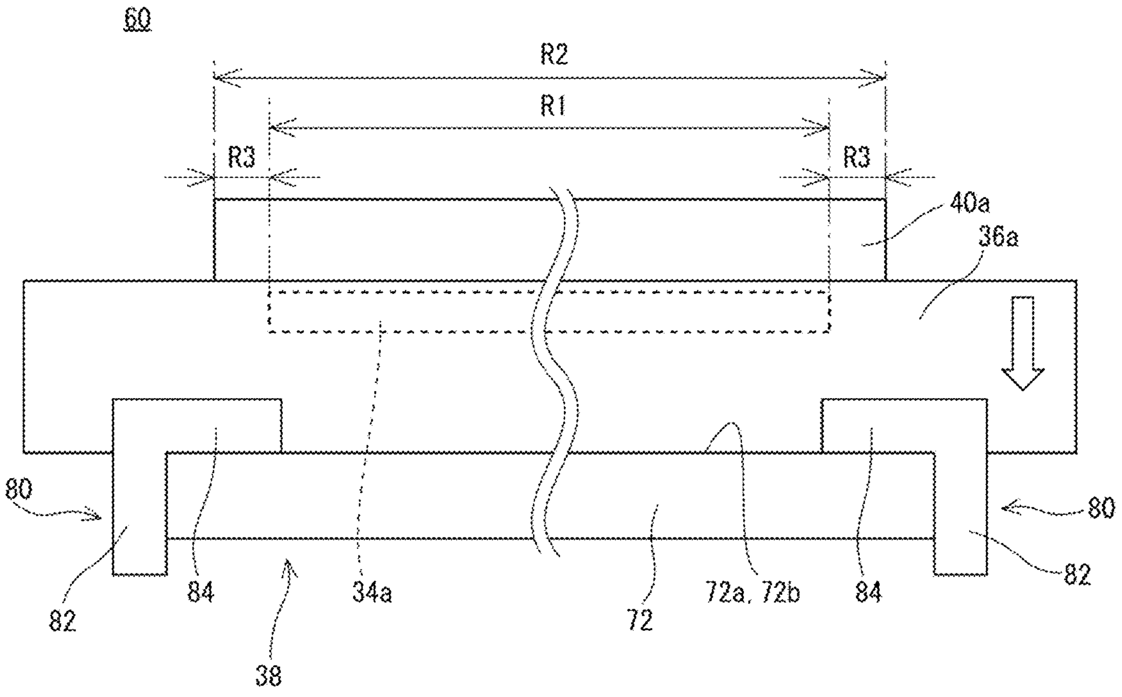
FIG. 3 is a diagram schematically illustrating an arrangement relationship of members in the process unit.

Next, the configuration of the process unit 60 will be described. As illustrated in FIGS. 2 and 3, the process unit 60 includes the photoreceptor drum 36, the cleaning device 38, the charging device 40, and the like, which are integrally held by a process frame 62 in a predetermined arrangement form.

The photoreceptor drum 36 includes a drum main body 36*a* formed with a photosensitive layer on a surface of a conductive cylindrical base, and is provided to extend in the front-rear direction. Flanges are fixedly attached to both end portions of the drum main body 36*a*, and a drum shaft 36*b* made of metal is provided in such a manner as to pass through a central portion of the flanges. Both end portions of the drum shaft 36*b* are rotatably supported by bearings provided in the process frame 62. Although not illustrated, a drive motor is coupled to a rear end portion of the drum shaft 36*b* via a coupling portion, a gear train, and the like. The drum main body 36*a* rotates with the rotation of the drum shaft 36*b*. That is, the photoreceptor drum 36 is supported by the process frame 62 to be rotatable about the drum shaft 36*b*, and is rotated by the driving force transmitted from the drive motor.

The charging device 40 includes a charging roller 40*a*, a cleaning roller 40*b*, and the like, and is provided under the photoreceptor drum 36. The charging roller 40*a* has a length slightly longer in a shaft direction than that of the developing roller 34*a* and slightly shorter in the shaft direction than that of the photoreceptor drum 36 (strictly speaking, the drum main body 36*a*), and is disposed in parallel with the photoreceptor drum 36. The charging roller 40*a* charges the surface of the photoreceptor drum 36 to a predetermined potential while rotating driven by the rotation of the photoreceptor drum 36 in a state in which the surface (outer side surface) of the charging roller 40*a* is in contact with (contacts) the surface of the photoreceptor drum 36 at a predetermined pressure. That is, in the present example, a contact charging scheme is adopted as a scheme of charging the photoreceptor drum 36. The cleaning roller 40*b* is disposed to be in contact with the surface of the charging roller 40*a* at a position on the opposite side to the photoreceptor drum 36, and removes foreign matter such as toner adhering to an outer circumferential surface of the charging roller 40*a*.

The cleaning device 38 includes a storage tank 70, the cleaning blade 72, a transport screw 74, and the like, and is provided at a side of the photoreceptor drum 36.

The storage tank 70 constitutes part of the process frame 62 and is formed in an elongated tubular shape extending in the front-rear direction along the photoreceptor drum 36. An opening is formed in a side portion of the storage tank 70, and the cleaning blade 72 is provided to extend in the front-rear direction along a lower edge portion of the opening.

The cleaning blade 72 is a long plate-shaped member formed of an elastic material such as urethane rubber. The thickness of the cleaning blade 72 is, for example, 2 mm. An edge portion 72*a* of the cleaning blade 72 is brought into contact with the surface of the photoreceptor drum 36 at the downstream side in a rotation direction of the photoreceptor drum 36 (that is, after the transfer) relative to the position for transferring to the intermediate transfer belt 52, and mechanically scrapes and removes the toner remaining on the surface of the photoreceptor drum 36 after the transfer. The toner (waste toner) scraped away by the cleaning blade 72 is stored in the storage tank 70. The transport screw 74 is rotatably provided in the storage tank 70. The transport screw 74 is rotated by the driving force transmitted from the drive motor so as to transport the toner scraped away by the cleaning blade 72 and stored in the storage tank 70 to the waste toner box.

The cleaning blade 72 is provided to extend over the substantially entire length of the drum main body 36*a* of the photoreceptor drum 36, and the length thereof in the longitudinal direction (front-rear direction) is set to a size slightly shorter than the length in the shaft direction of the drum main body 36*a*. As described above, the charging roller 40*a* has a length slightly longer in the shaft direction than that of the developing roller 34*a* and slightly shorter in the shaft direction than that of the drum main body 36*a* of the photoreceptor drum 36. That is, a charging region R2 is wider than a development region R1 in the photoreceptor drum 36.

Further, seal members 80 (side seals) are provided at positions corresponding to both side end portions of the cleaning blade 72 in such a manner as to be in contact with (surface-contact) the surface of the photoreceptor drum 36. The seal members 80 prevent the leakage of toner from the both side end portions of the cleaning blade 72 to the outside of the storage tank 70.

In the process unit 60 including the above-discussed cleaning device 38, the toner remaining on the surface of the photoreceptor drum 36 after the transfer is removed and collected by the cleaning blade 72 as described above. The collected toner (waste toner) serves as a lubricant in the edge portion 72*a* of the cleaning blade 72 (the contact portion between the cleaning blade 72 and the photoreceptor drum 36). Because of this, in a case where a state in which the amount of toner is small continues at the edge portion 72*a* of the cleaning blade 72, there is a possibility that the frictional resistance increases and the cleaning blade 72 is reversed. In particular, at the both side end portions of the cleaning blade 72 (more specifically, portions within the charging regions of the photoreceptor drum 36 and outside of the development regions), the amount of supply of toner is small, whereby the cleaning blade 72 is likely to be reversed or curled. In particular, in the case of a device using a contact charging scheme, oxidation due to minute discharge is likely to progress on the surface of the photoreceptor drum 36, and a symptom of an increase in frictional force with the cleaning blade 72 due to a change in surface properties is also added, so that the cleaning blade 72 is more likely to be reversed or curled.

Therefore, in the first example, the arrangement form of the seal members 80 is devised so that each seal member 80 also functions as a toner holding member, whereby the toner can be continuously supplied to the edge portion 72*a* at each side end portion of the cleaning blade 72, and the cleaning blade 72 can be appropriately prevented from being curled and reversed with a simple configuration. This will be specifically described below.

Figure 4:
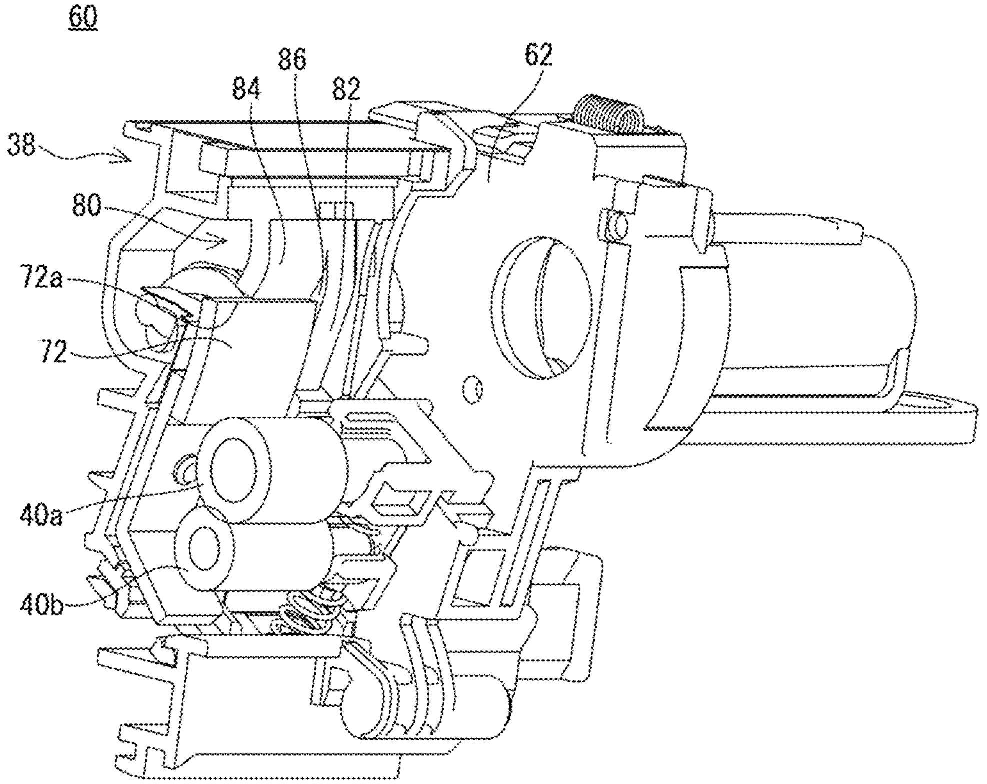
FIG. 4 is a perspective view illustrating a peripheral portion of a seal member of the process unit.

As illustrated in FIGS. 3 and 4, the seal members 80 each include a first sealant 82 and a second sealant 84, and are respectively provided at the positions corresponding to both side end portions of the cleaning blade 72. The first sealant 82 extends in a circumferential direction of the photoreceptor drum 36 along a side end surface (end surface in the longitudinal direction) of the cleaning blade 72. The second sealant 84 extends from one end portion (upstream-side end portion in the rotation direction of the photoreceptor drum 36) of the first sealant 82, and extends in the shaft direction of the photoreceptor drum 36 along a tip surface 72*b* (edge portion 72*a*) of the cleaning blade 72. That is, the second sealant 84 is disposed at the upstream side of the cleaning blade 72 in the rotation direction of the photoreceptor drum 36.

Figure 5:
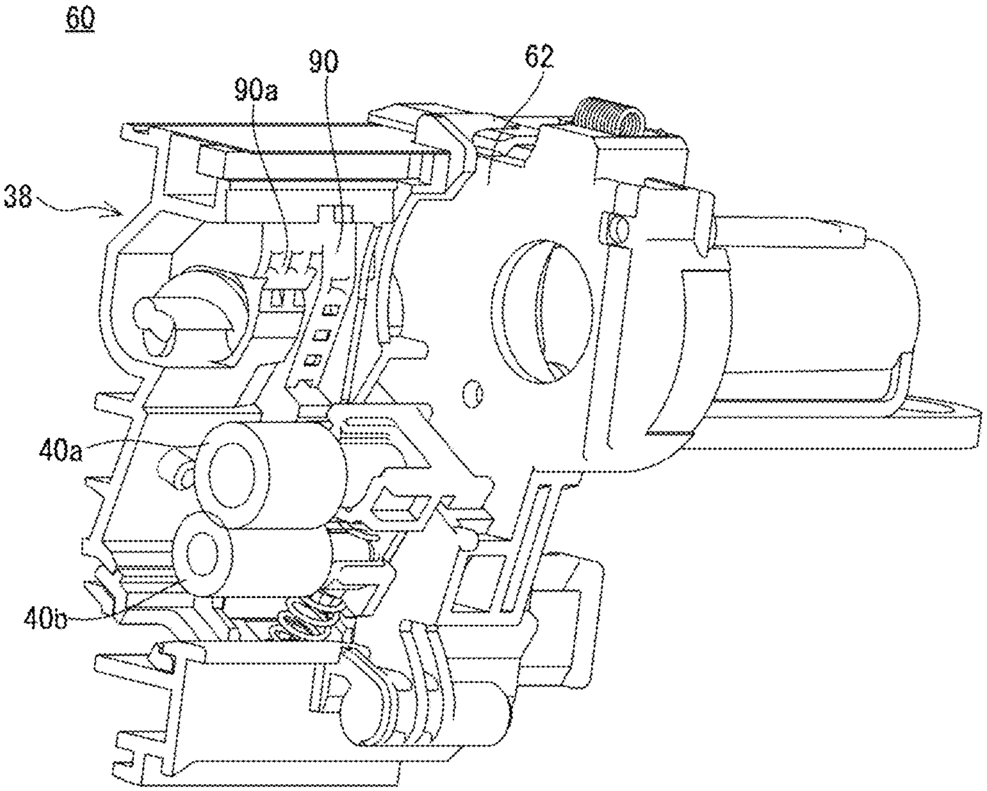
FIG. 5 is a perspective view illustrating a peripheral portion of an attachment portion of the seal member of the process unit.

The seal member 80 is formed of a material having a sealing property and flexibility such as a nonwoven fabric, a woven fabric, or a foam material. In the present example, the seal member 80 is formed of a moquette material. The seal member 80 is, for example, 3 mm in thickness. The seal member 80 is fixedly attached to an attachment portion 90 formed on the process frame 62 using a double-sided tape or an adhesive. As clearly understood from FIGS. 4 and 5, the attachment portion 90 for the seal member 80 includes an attachment surface 90*a* to be attached with an end portion on the cleaning blade 72 side of the second sealant 84. The attachment surface 90*a* is inclined to be away from the surface of the photoreceptor drum 36 toward the cleaning blade 72 side (downward in FIG. 5). With this, as will be described later, the end portion on the cleaning blade 72 side of the second sealant 84 is disposed at a position separated from the surface of the photoreceptor drum 36, and the separation distance gradually increases toward the cleaning blade 72 side.

Figure 6:
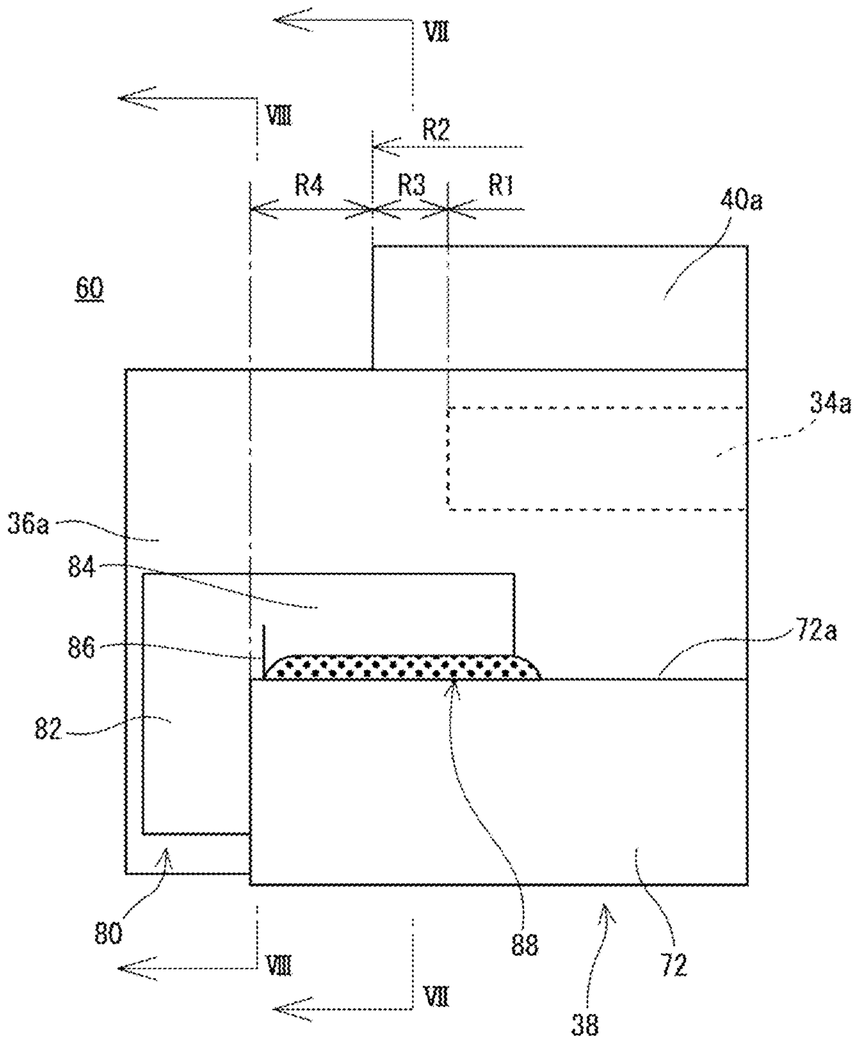
FIG. 6 is a diagram schematically illustrating an arrangement relationship of members in the peripheral portion of the seal member of the process unit.

As illustrated in FIGS. 3 and 6, the second sealant 84 of the seal member 80 is extended to a position including a first region R3 within the charging region R2 and outside of the development region R1 in the photoreceptor drum 36 (strictly speaking, the drum main body 36*a*). The extended second sealant 84 functions as a toner holder, as described later. At this time, the second sealant 84 may be formed extending to a position including at least an outer-side end portion of the first region R3 (an end portion in the longitudinal direction of the charging region R2). More preferably, it may be formed extending to a position across the entire length of the first region R3 (the entire length thereof in the shaft direction of the photoreceptor drum 36). This is because, in the case of the contact charging scheme, the state change of the surface of the photoreceptor drum 36 due to discharge action is large, and in a charging end portion, a difference in frictional force is likely to become large at an adjacent portion between the charged region and the non-charged region, whereby the blade edge is likely to be twisted, and consequently the cleaning blade 72 is likely to be curled or reversed. Further, the second sealant 84 may be formed extending to a position including an end portion in the longitudinal direction of the development region R1. This is because, in the end portion in the longitudinal direction of the development region R1, there is a case in which the difference in frictional force increases depending on whether or not toner serving as a lubricant is supplied, and the blade edge is likely to be twisted. These may be selected as appropriate in view of the behavior of the image forming device 10. In the present example, the second sealant 84 is extended to a position slightly entering the end portion in the longitudinal direction of the development region R1.

Figure 7:
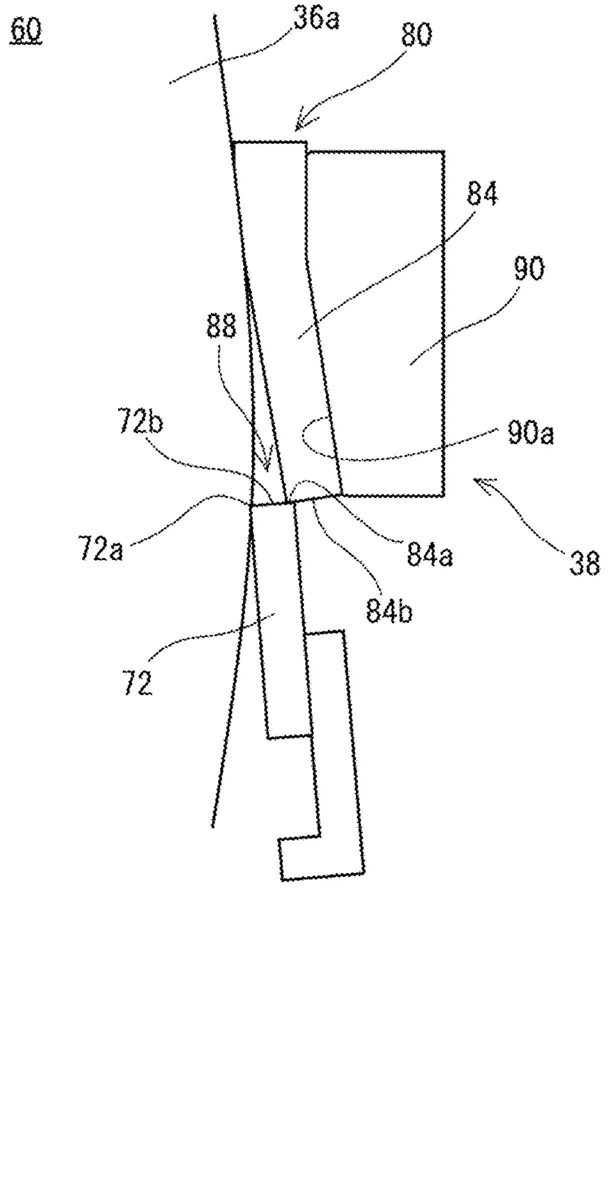
FIG. 7 is a cross-sectional view schematically illustrating a cross section of the peripheral portion of the seal member of the process unit taken along a line VII-VII in FIG. 6.

As illustrated in FIGS. 6 and 7, an end portion on the cleaning blade 72 side of the second sealant 84 is disposed at a position away from the surface of the photoreceptor drum 36, and a space 88 having a predetermined interval is formed between the end portion on the cleaning blade 72 side of the second sealant 84 and the surface of the photoreceptor drum 36. The space 88 is formed extending from a tip of the second sealant 84 (an inner-side end of the second sealant 84 in the shaft direction of the photoreceptor drum 36) to a position including the first region R3, and functions as a toner storage space as described below. Further, by causing the end portion on the cleaning blade 72 side of the second sealant 84 to be away from the surface of the photoreceptor drum 36 (i.e., the edge portion 72*a* of the cleaning blade 72), it is possible to prevent the second sealant 84 from interfering with the edge portion 72*a* of the cleaning blade 72. At this time, it is preferable for the space 88 to be formed extending to a position including the outer-side end portion of the first region R3 (the end portion in the longitudinal direction of the charging region R2). As described above, this is because the cleaning blade 72 is likely to be curled or reversed at this portion. In the present example, the space 88 is formed over the substantially entire length of the second sealant 84, that is, formed extending to a position near the side end surface of the cleaning blade 72.

It is preferable that the separation distance between the end portion on the cleaning blade 72 side of the second sealant 84 and the surface of the photoreceptor drum 36 (the size of the space 88 in a radial direction of the photoreceptor drum 36) gradually increase toward the cleaning blade 72 side. In the present example, the attachment surface 90*a* to be attached with the end portion on the cleaning blade 72 side of the second sealant 84 is formed as an inclined surface, so that the size of the space 88 gradually increases toward the cleaning blade 72 side. The space 88 can also be formed between the end portion on the cleaning blade 72 side of the second sealant 84 and the surface of the photoreceptor drum 36 by recessing the attachment surface 90*a* in a step shape instead of forming the attachment surface 90*a* as an inclined surface. However, in consideration of the stability of attachment of the seal member 80 with respect to the attachment portion 90, it is preferable for the attachment surface 90*a* to be an inclined surface.

Further, also in the case where the space 88 is formed between the end portion on the cleaning blade 72 side of the second sealant 84 and the surface of the photoreceptor drum 36, it is preferable that an end surface 84*b* on the cleaning blade 72 side of the second sealant 84 be in contact with the tip surface 72*b* of the cleaning blade 72 in at least a part in the radial direction of the photoreceptor drum 36. This is because, in a case where the tip surface 72*b* and the end surface 84*b* are separated from each other, there is a possibility that the toner leaks from a gap between the tip surface 72*b* and the end surface 84*b* and the toner cannot be appropriately stored in the space 88.

A separation distance between an edge 84*a* on the cleaning blade 72 side of the second sealant 84 and also on the photoreceptor drum 36 side and the surface of the photoreceptor drum 36 is preferably in a range from 0.2 mm to a value that is 0.2 mm smaller than the thickness of the cleaning blade 72. For example, when the cleaning blade 72 is 2.0 mm in thickness, it is sufficient for the edge 84*a* of the second sealant 84 to be disposed in a range from 0.2 mm to 1.8 mm from the edge portion 72*a* in terms of the separation distance. This is because, when the separation distance between the edge 84*a* of the second sealant 84 and the surface of the photoreceptor drum 36 is too small, the space 88 becomes small and it becomes difficult to store the toner. In addition, this is because, although errors (variations) occur due to dimensions, attachment accuracy, aged deterioration, and the like of the components, by providing a margin of about 0.2 mm, it is possible to reliably prevent the second sealant 84 from interfering with the edge portion 72*a* of the cleaning blade 72 or separating from the tip surface 72*b* of the cleaning blade 72.

Figure 8:
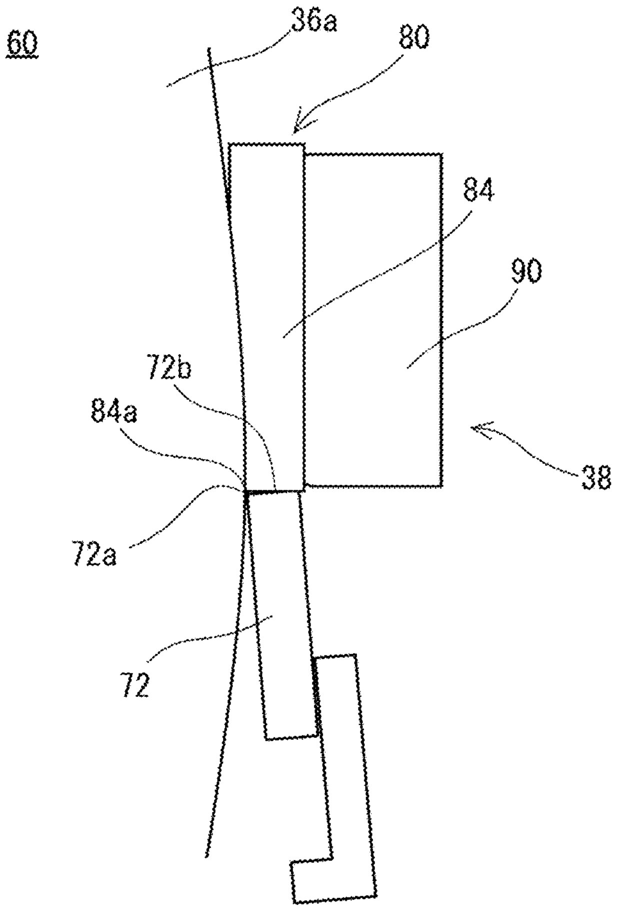
FIG. 8 is a cross-sectional view schematically illustrating a cross section of the peripheral portion of the seal member of the process unit taken along a line VIII-VIII in FIG. 6.

As illustrated in FIG. 8, it is preferable that a base end portion of the second sealant 84 (a portion coupled to the first sealant 82) and the first sealant 82 at the outer side of the base end portion be in contact with (surface-contact) the surface of the photoreceptor drum 36 over the substantially entire length in the circumferential direction of the photoreceptor drum 36. The purpose of this configuration is to secure the sealing function by the seal member 80.

Further, in the present example, as illustrated in FIGS. 4 and 6, the second sealant 84 has a slit 86 extending from the end surface 84*b* on the cleaning blade 72 side in a direction orthogonal to the end surface 84*b*. The slit 86 is preferably formed at a position in a second region R4 between a side end of the cleaning blade 72 and a side end of the charging region R2. In the present example, the slit 86 is formed at the base end portion of the second sealant 84. By forming the slit 86 in the second sealant 84, the seal member 80 and the attachment portion 90 can be easily brought into close contact with each other even when a step is formed in the attachment portion 90 of the seal member 80 (the height of the attachment surface changes) in order to form the space 88, thereby making it possible to obtain good workability and a stable sealing property.

In the cleaning device 38 including the above-described seal member 80, as illustrated in FIG. 6, part of the toner (waste toner) scraped away from the surface of the photoreceptor drum 36 by the cleaning blade 72 enters the space 88 along the edge portion 72*a* of the cleaning blade 72 from the inner side in the shaft direction of the photoreceptor drum 36, and is stored (held) in the space 88. That is, the space 88 functions as a toner storage space. Then, a small amount of toner stored in the space 88 is gradually resupplied to the edge portion 72*a* of the cleaning blade 72 as a lubricant, so that a rapid change in the friction coefficient between the photoreceptor drum 36 and each of the end portions (first region R3) of the cleaning blade 72 is suppressed. Thus, the cleaning blade 72 is appropriately prevented from being curled and reversed.

Further, since the end portion on the cleaning blade 72 side of the second sealant 84 is made to be away from the surface of the photoreceptor drum 36, it is possible to prevent the second sealant 84 from interfering with the edge portion 72*a* of the cleaning blade 72. When the second sealant 84 interferes with the edge portion 72*a* of the cleaning blade 72, an incident occurs in which the toner slips through the interfering portion (cleaning failure), resulting in contamination of the charging roller 40*a*, fogging due to charging failure, and the like. There is a possibility that a cleaning failure progresses due to the fogging toner, whereby toner-scattering at a position near the seal member 80, toner-sticking on the surface of the photoreceptor drum 36, or the like may be caused. However, the present example can solve such problems.

It is possible to store the toner in the space 88 only by normal text printing. However, in order to secure the storage amount of toner by the second sealant 84 of the seal member 80 and to more reliably prevent the cleaning blade 72 from being curled and reversed, solid discharge may be executed when a predetermined condition is satisfied. Note that, however, in the present example, since the toner can be stored in the space 88, lubricating action can be maintained even by a small amount of solid discharge. The solid discharge may be performed over the entire length of the development region R1 or may be performed only on both end portions of the development region R1.

As described thus far, according to the first example, with a simple configuration in which the second sealant 84 of the seal member 80 extends to the first region R3 and the end portion on the cleaning blade 72 side of the second sealant 84 in the first region R3 is disposed at a position away from the surface of the photoreceptor drum 36, it is possible to prevent the frictional force from being excessively generated between the photoreceptor drum 36 and the cleaning blade 72, and to appropriately prevent the cleaning blade 72 from being curled and reversed.

In addition, by disposing the end portion on the cleaning blade 72 side of the second sealant 84 at a position away from the surface of the photoreceptor drum 36, it is possible to prevent the interference of the second sealant 84 with the edge portion 72*a* of the cleaning blade 72, thereby making it possible to appropriately prevent failures such as a cleaning failure caused by the above interference.

Second Example

Figure 9:
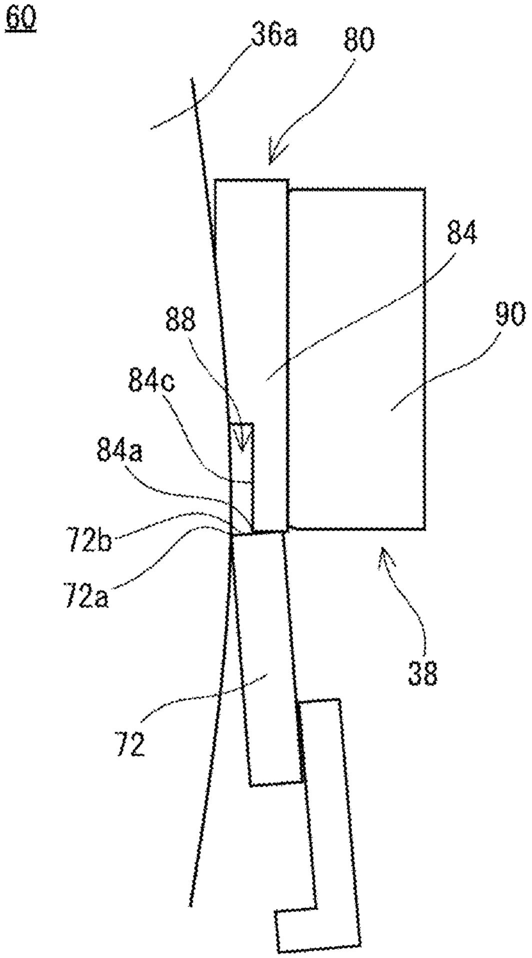
FIG. 9 is a cross-sectional view schematically illustrating a cross section of a peripheral portion of a seal member of a process unit according to a second example.

Next, the cleaning device 38 according to a second example of the disclosure will be described with reference to FIG. 9. In the second example, the shapes of the seal member 80 and the attachment portion 90 are different from those of the first example. Since the other portions are similar to those of the first example, portions common to those of the first example are denoted by the same reference numerals, and redundant description thereof is omitted or simplified.

In the second example, instead of forming the attachment surface 90*a* as an inclined surface, a recess 84*c* is formed at the end portion on the cleaning blade 72 side of the second sealant 84, so that the end portion on the cleaning blade 72 side of the second sealant 84 is disposed at a position away from the surface of the photoreceptor drum 36, thereby forming the space 88 having a predetermined interval therebetween. In the present example, the recess 84*c* is formed so that a cross section of the space 88 viewed in the shaft direction of the photoreceptor drum 36 is substantially rectangular, but the above-mentioned cross section is not particularly limited thereto. For example, the recess 84*c* may also be formed such that the size of the space 88 gradually increases toward the cleaning blade 72 side.

In the second example as well, the same function effect as that in the first example can be exhibited, and curling and reversing of the cleaning blade 72 can be appropriately prevented with a simple configuration.

In the above-described examples, a multifunction peripheral in which a copy machine, a facsimile, a printer, and the like are combined is exemplified as the image forming device. However, the image forming device may be any of a copy machine, a facsimile, a printer, and the like, or may be a multifunction peripheral in which at least two of them are combined. The image forming device may be a monochromatic image forming device. The image forming device is not limited to an intermediate transfer type, and may be a direct transfer type in which a toner image is directly transferred from a photoreceptor drum to a sheet.

It should be noted that the specific component shapes, dimensions, arrangement forms, and the like described above are merely examples, and can be appropriately changed in accordance with needs such as specifications of the product.

The invention claimed is:

1. A cleaning device that removes toner remaining on a surface of an image carrier, the cleaning device comprising:

a cleaning blade having an edge portion at a tip side of the cleaning blade in contact with the image carrier, to scrape away the toner remaining on the surface of the image carrier; and a respective seal member in contact with the surface of the image carrier at each of two positions corresponding to side end portions of the cleaning blade, wherein;

each seal member comprises a first sealant extending along a side end surface of the cleaning blade, and a second sealant extending from one end portion of the first sealant and extending along a tip surface of the cleaning blade, the second sealant extends to a position including a first region that is within a charging region and that is outside of a development region, and an end portion on a cleaning blade side of the second sealant in the first region is angled away from the surface of the image carrier.

2. The cleaning device according to claim 1, wherein a separation distance, between the end portion on the cleaning blade side of the second sealant in the first region and the surface of the image carrier, gradually increases in a direction away from the surface of image carrier and toward the cleaning blade side.

3. The cleaning device according to claim 2, wherein an attachment surface to which the end portion on the cleaning blade side of the second sealant in the first region is attached is an inclined surface that separates from the surface of the image carrier in the direction away from the surface of the image carrier and toward the cleaning blade side.

4. The cleaning device according to claim 1, wherein an end surface on the cleaning blade side of the second sealant in the first region is in contact with the tip surface of the cleaning blade.

5. The cleaning device according to claim 1, wherein a separation distance between an edge on the cleaning blade side of the second sealant in the first region and also on the image carrier side and the surface of the image carrier is in a range from 0.2 mm to a value that is 0.2 mm smaller than a thickness of the cleaning blade.

6. The cleaning device according to claim 1, wherein the second sealant includes a slit extending from an end surface on the cleaning blade side of the second sealant in a direction orthogonal to the end surface.

7. The cleaning device according to claim 6, wherein the slit is formed at a position in a second region between a side end of the cleaning blade and a side end of the charging region.

8. An image forming device, comprising:

an image carrier;

a charging device that charges a surface of the image carrier; and the cleaning device according to claim 1.

9. The image forming device according to claim 8, wherein the charging device charges the image carrier using a contact charging scheme.

* * * * *